No. 895,631. PATENTED AUG. 11, 1908.
L. G. HAASE.
ADJUSTABLE SCRAPER COUPLING.
APPLICATION FILED AUG. 22, 1907.
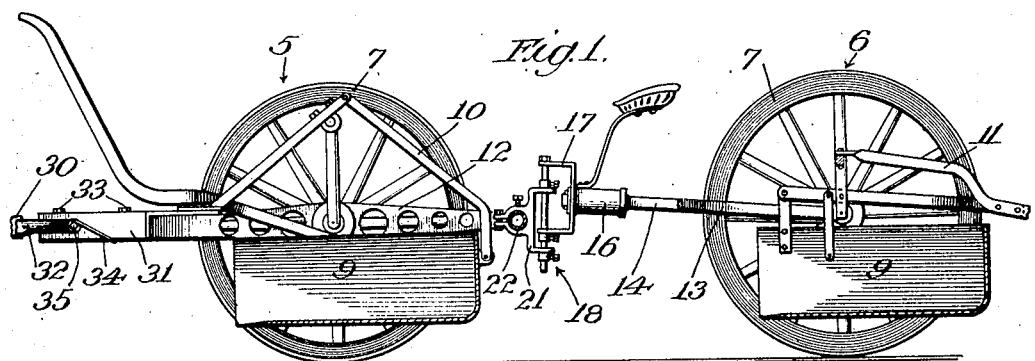
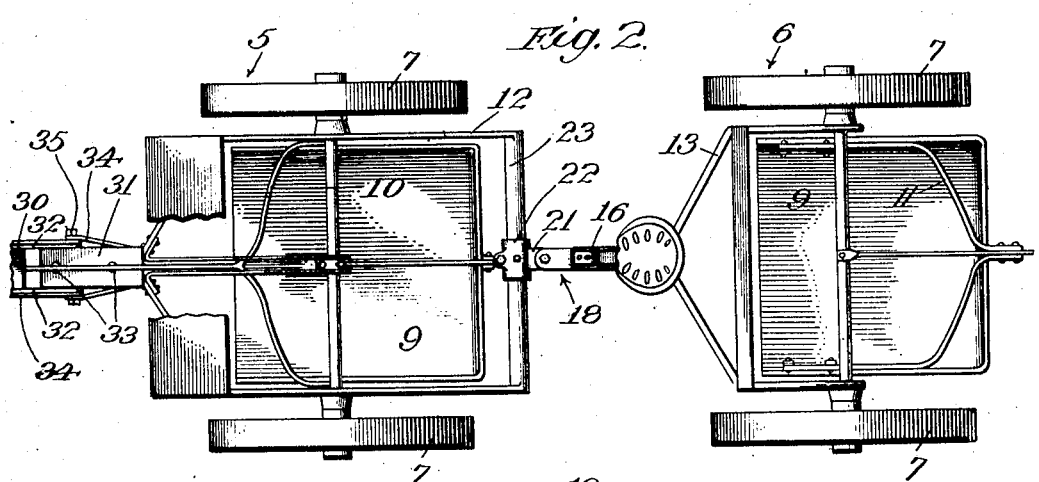
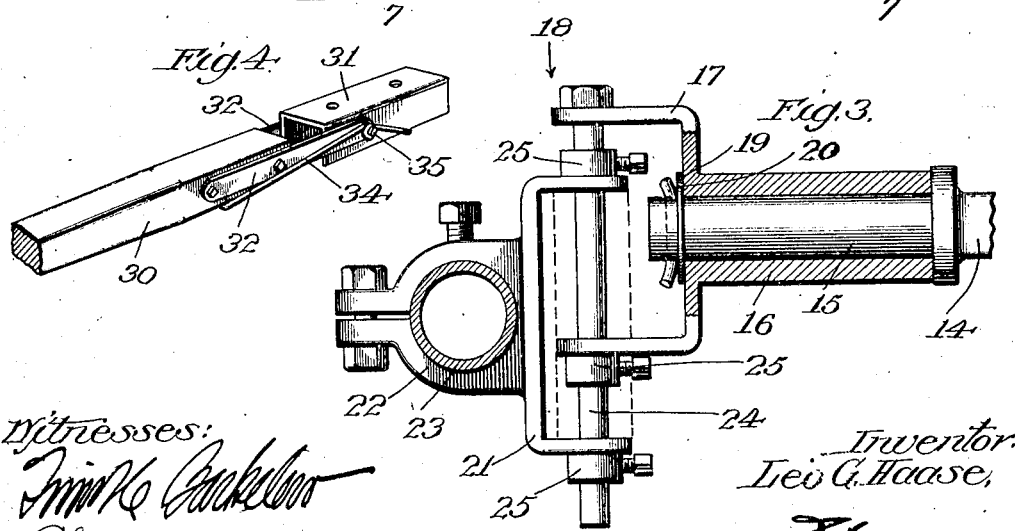
Witnesses:
Inventor.
Leo G. Haase,
Attorneys

UNITED STATES PATENT OFFICE.

LEO G. HAASE, OF PASADENA, CALIFORNIA.

ADJUSTABLE SCRAPER-COUPLING.

No. 895,631.

Specification of Letters Patent.

Patented Aug. 11, 1908.

Application filed August 22, 1907. Serial No. 389,635.

*To all whom it may concern:*

Be it known that I, LEO G. HAASE, a citizen of the United States, residing in the city of Pasadena, county of Los Angeles, State of California, have invented new and useful Improvements in Adjustable Scraper-Couplings, of which the following is a specification.

This invention relates to an improvement on my invention entitled "Scraper" set forth in my application S. N. 380,747, filed June 25th, 1907, and allowed July 30th, 1907, and the object thereof is to provide a coupling similar in construction to the coupling shown in that application which further allows of the adjustment of the individual scrapers according to the conditions under which the same are used. I accomplish this object by means of the device described herein and illustrated in the accompanying drawings in which:—

Figure 1.—is a sectional elevation of a double scraper provided with my improved coupling. Fig. 2.—is a plan view of the same. Fig. 3.—is an enlarged sectional view of the coupling. Fig. 4.—is a detailed perspective of the draft tongue showing the means of attachment to the front scraper frame.

Referring to the drawings, 5 and 6 designate the front and rear truck members of my improved scraper both equipped with wheels 7 and adapted to carry scraper pans 9 manually operated by mechanisms 10 and 11, respectively; rear member 6 being in all respects similar to the wheeled scraper of usual construction while forward member 5 is provided with a specially constructed frame which passes entirely around the pan, the object of which will appear hereinafter.

Frame 13 of rear member 6 is provided with a short pole 14 which is round on its forward end at 15 and adapted to fit into sleeve 16 rigidly secured to member 17 of hinge 18. A collar 19 and a pin 20 prevent longitudinal movement of the pole in the sleeve. The other member 21 of hinge 18 is rigidly secured to frame 12 of forward member 5, which frame extends rearwardly around the scraper frame for this purpose, by means of a clamp 22 which is adapted to grip cylindrical bar 23 forming the rear portion of frame 12. Clamp 22 is provided with a set screw in addition to the clamp bolt to aid in holding the clamp in the frame.
Members 17 and 21 are pivotally connected together by means of a bolt 24 having a plurality of collars 25 adjustably secured thereon. By means of adjusting these collars the position of the two hinged members with relation to each other may be varied so that one member may be at any distance above the other. By so adjusting the two members of the hinge the frames of each of the scrapers may be tipped from the horizontal to such an angle as will enable them to be worked most efficiently. Clamp 22 provides means for changing the position of member 21 on frame 12 whenever the relative placement of the two hinged members is changed.

As stated in my former application above referred to this construction enables me to make use of a loose pole for the forward scraper and I have shown such a loose pole 30 with convenient attaching means therefor in Fig. 4. Pole 30 is provided with an inverted channel member 31 to which it is pivotally secured by means of flat bars 32 and which is adapted to fit over the usual tongue on such a scraper as is shown, the tongue being cut off close to frame 12. Channel member 31 is then placed over the remaining piece of tongue and bolted thereto by means of bolts 33. A spring 34 passes under both the channel member and the tongue, being coiled around bolt 35, which also forms the pivot for tongue 30, and supports the tongue so that no weight need be carried upon the horse's neck.

It will be observed that I have provided a scraper coupling which includes all the advantages set forth in my former application above referred to with the added advantage of complete adjustability of the integral members of the scraper. It will further be noted that the coupling is simple in construction and in adjustment so that it is not liable to become disordered in consequence of rough usage.

Having described my invention what I claim as new and desire to secure by Letters Patent is:—

1. In a scraper coupling a horizontally swinging hinge comprising a forward member and a rear member, said forward member being provided with a clamp adapted to engage a scraper frame, said rear member being provided with a swivel connection to a scraper frame, and means to vertically adjust the relative positions of said members.

2. In a scraper coupling a forward member provided with a clamp adapted to engage a scraper frame, a rear member provided with a horizontal swivel connection with a second scraper frame, a vertical bolt passing through both of said members and on which said members are adapted to swing, and adjustable means on said bolt to space said members apart.

3. In a scraper coupling a forward member provided with a clamp adapted to engage a scraper frame, a rear member provided with a horizontal sleeve adapted to receive the forward end of a second scraper frame, a vertical bolt passing through both of said members and on which said members are adapted to swing, and adjustable collars on said bolt adapted to space said members apart.

In witness that I claim the foregoing I have hereunto subscribed my name this 15th day of August, 1907.

LEO G. HAASE.

Witnesses:
TRIMBLE BARKELEW,
OLLIE PALMER.